United States Patent [19]

Rademacher-Dubbick

[11] Patent Number: 4,604,905

[45] Date of Patent: Aug. 12, 1986

[54] MEASURED-VALUE SENSORS FOR MAGNETIC-INDUCTIVE FLOWMETERS

[75] Inventor: Kristian Rademacher-Dubbick, Duisburg, Fed. Rep. of Germany

[73] Assignee: Rheometron A.G., Basel, Switzerland

[21] Appl. No.: 653,217

[22] PCT Filed: Dec. 30, 1983

[86] PCT No.: PCT/EP83/00351

§ 371 Date: Sep. 17, 1984

§ 102(e) Date: Sep. 17, 1984

[87] PCT Pub. No.: WO84/02976

PCT Pub. Date: Aug. 2, 1984

[30] Foreign Application Priority Data

Jan. 18, 1983 [EP] European Pat. Off. ......... 83200069.6

[51] Int. Cl.⁴ ............................................... G01F 1/58
[52] U.S. Cl. ............................................... 73/861.12
[58] Field of Search ...................... 73/861.12; 310/11

[56] References Cited

U.S. PATENT DOCUMENTS 3,475,352 10/1969 Barbier et al. ............... 310/11 X
3,574,142 4/1971 Yerouchalmi ............... 310/11
3,746,896 7/1973 Gruner .
3,750,468 8/1973 Grauer .
4,341,965 7/1982 Onuo et al. ............... 310/11
4,388,834 6/1983 Schmoock .
4,507,975 4/1985 Bittner et al. ............... 73/861.12

FOREIGN PATENT DOCUMENTS 2950039 7/1981 Fed. Rep. of Germany .
2068122 1/1980 United Kingdom .

OTHER PUBLICATIONS

Friedrichsfeld leaflet titled "Frialit Gleitringe aus Siliziumkarbid–SiC 198.

Primary Examiner—Herbert Goldstein
Attorney, Agent, or Firm—Karl F. Ross; Herbert Dubno

[57] ABSTRACT

A measured-value sensor for a flowmeter of the type which can be connected in a pipeline traversed by the flow of a conductive material which has a ceramic tube in which a pair of ceramic electrodes of relatively high conductivity by comparison to the electrical conductivity of the remainder of the tube are fused and thereby integrated. A conductive ceramic ring in the form of a grounding ring may be fused to the tube at one end thereof.

5 Claims, 2 Drawing Figures

MEASURED-VALUE SENSORS FOR MAGNETIC-INDUCTIVE FLOWMETERS

CROSS REFERENCE TO RELATED APPLICATIONS

This application is a national phase application of PCT/EP83/00351 filed Dec. 30, 1983 and based upon a European application EP 83 200 069.9 filed Jan. 18, 1983.

FIELD OF THE INVENTION

The invention relates to a measured-value sensor for magnetic-inductive flowmeters consisting of an electrically insulating ceramic measuring tube with measuring electrodes tightly mounted therein upon sintering.

BACKGROUND OF THE INVENTION

A tubular measured-value sensor for a magnetic-inductive flowmeters can be attached between the connecting flanges of a duct and traversed by a conductive liquid in a direction transverse to the direction of the magnetic field. The voltage proportional to the flow rate is tapped off at two measuring electrodes and conducted via a current conductor to a signal converter. As a rule, the measuring tube of the measured-value sensor consists of a metal tube provided with an inner jacket with an insulating layer or a tube of synthetic material. Mostly, metallic measuring electrodes are used which are inserted in the metal tube and insulated. According to the DE-C2-29 50 039 electrodes can be made of powder- or fiber-like particles of an electrically conductive material, such as carbon, graphite or metal, which are imbedded in an electrically insulating coating in the area of the electrodes.

Further, a measured-value sensor with a ceramic measuring tube as disclosed in DE-A1-23 30 593 which can be fastened between the two flanges of a pipe by interposing sealing rings. In the case of measuring tubes manufactured according to the process of producing ceramic electroinsulators, the electrodes are fused to the vitrified inner jacket and are provided with wire conductors passing through radial bores.

In order to obtain an especially tightly sealed and resistant ceramic measuring tube capable of withstanding liquids under high pressure, and aggressive and hot liquids, in the prior PCT/EP82/00097 it has been proposed to manufacture the measuring tube of vitrified ceramic material into which the shaft of the metallic measuring electrodes is sealingly sintered. Differences in the heat expansion of the ceramic material and the metallic measuring electrodes can, however, lead to stresses and breakage during cooling. The embedding of the electricaly conductive particles in the insulating coating of the measuring tube known from DE-C2-29 50 039 can not be applied to the ceramic measuring tube due to the high sintering temperatures of the ceramic material.

It is also known for measured-value sensors to mount grounding rings between the measuring tube and the connection flanges of the pipe, which are in contact with the conductive liquid and are directly grounded or conductively connected with the grounded metal casing of the measured-value sensor. These grounding rings require sealing rings on both their sides. Such a construction is cumbersome and frequently leads to leakage. An additional operation is also required to form the conductive paths after sintering of the ceramic measuring tube in order to make the grounding rings. In this case a putty with current-conductive particles is applied and the ceramic measuring tube is subsequently reheated to create on the surface of the measuring tube a thin conductive film solidly adhering thereto (compare PCT/EP 82/00097).

OBJECT OF THE INVENTION

The object of the invention is to provide a measured-value sensor of this kind with measuring electrodes tightly sintered into it, which do not lead to stress breakage even in the case of temperature variations.

SUMMARY OF THE INVENTION

This object is attained according to the invention by substituting as described below bodies of an electrically conductive ceramic material as electrodes for metal electrodes as have been used heretofore.

In an advantageous way, these measuring electrodes consisting of a conductive ceramic material are hermetically sintered into the ceramic measuring tube. The construction parts made of ceramic materials namely the measuring tube and the measuring electrodes sintered therein distinguish themselves by a good resistance to temperature variations, strength, corrosion resistance and friction resistance. They comply this way with the requirements imposed for measuring tubes of measured-value sensors.

While in the case of the known magnetic-inductive flowmeters, even when these were provided with a ceramic measuring tube with metallic measuring electrodes sintered into the tube, it was not possible to use them for the hydraulic transport of solid materials, such as sand, ores, and the like due to the friction wear of the measuring electrodes, the construction according to the invention allows a flow measuring of suspensions containing hard solid materials.

Especially suited as an electrically insulating ceramic material for the measuring tube is for instance silicon nitride, while for the measuring electrode a good electrically conductive ceramic material, for instance silicon carbide is suitable. Both ceramic materials can be produced with a variety of electrical conductivities, respectively resistivities, so that a proper selection can be made for the insulating measuring tube as well as for the electrically conductive measuring electrodes. For instance, the specific resistivity of $Si_3N_4$ between the temperatures from 20° C. to 300° can range approximately between $10^{15}$ and $10^{10}$ $\Omega m$, while the specific resistivity of SiC in this temperature range lies below $10^{-1}$ $\Omega m$. Depending on the technical conditions, the specific resistivity of the ceramic material for the measuring electrodes can reach up to $10^9$ $\Omega m$. Instead of silicon nitride and silicon carbide other ceramic materials with corresponding specific resistivities can also be used.

In a further development of the teaching of the invention, a grounding ring of an electrically conductive ceramic material can be sintered to at least one frontal side of the ceramic measuring tube. Such a ceramic grounding ring has the same advantages as the ceramic electrodes imbedded by sintering.

The sealingly imbedding upon sintering of the measuring electrodes, and the attaching upon sintering of the grounding rings can follow various processes. For instance, the bodies for the measuring electrodes and grounding rings made of unburnt raw materials can be molded into or molded onto the unburnt or green of the measuring tube and subsequently ceramically burnt or fried. According to another method the bodies and the measuring tube can first be prefused as independent bodies and than pasted together with a ceramic mass and then, once again burnt.

BRIEF DESCRIPTION OF THE DRAWING

Two embodiments of the invention are shown in the drawing, which shows.

SPECIFIC DESCRIPTION

Figure 1:
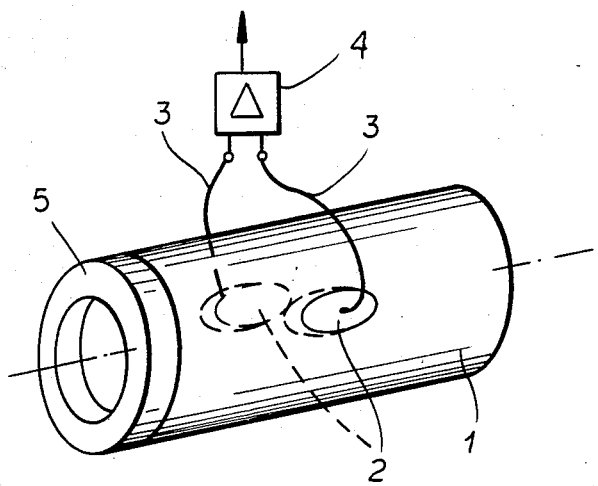
FIG. 1 a ceramic measuring tube with two ceramic measuring electrodes and a grounding ring in a perspective representation.

The ceramic measuring tube 1 shown in FIG. 1 is part of a measured-value sensor for a magnetic-inductive flowmeter. Other parts of the measured-value sensor such as magnetic coils, casing and the like are not represented.

The ceramic measuring tube 1 consists of a ceramic material with basically electrically insulating properties. Besides, the ceramic material is so selected that the measuring tube 1 has a high resistance to temperature variations, strength, friction wear and corrosion resistance. Especially suited is silicon nitride.

Bodies made of an electrically conductive ceramic material are provided as measuring electrodes 2. Both measuring electrodes 2 are connected to an amplifier 4 via a current conductor 3, the output of the amplifier 4 leading to a signal modulator (not shown). These bodies should as much as possible have the same other material properties such as stability under temperature variations, strength, wear resistance against friction and corrosion resistance. Silicon carbide belongs to the particularly suited materials for the ceramic measuring electrodes 2.

In accordance with the desired features of the measured-value sensor, other ceramic materials can also be selected for the measuring tube and the measuring electrodes.

In those cases where the ceramic measuring tube 1 needs grounding, to at least one frontal side thereof a grounding ring 5 made of an electrically conductive ceramic material can be sintered, according to a simple further development of the invention. Advantageously, the same ceramic material is thereby used as the one of which the measuring electrodes 2 are made. If necessary, both frontal ends of the measuring tube 1 can be provided with a grounding ring 5.

For sealingly imbedding through sintering of the measuring electrodes 2, respectively attaching upon sintering of the grounding rings 5 various processes are suited. For instance, the bodies of the measuring electrodes and grounding rings made of unburnt raw materials can be molded into or molded to the yet unburnt blank of the measuring tube and subsequently ceramically burnt. According to another method, the bodies and the measuring tube can first be prefused as independent bodies, and pasted together with a ceramic mass and then burnt once again.

Figure 2:
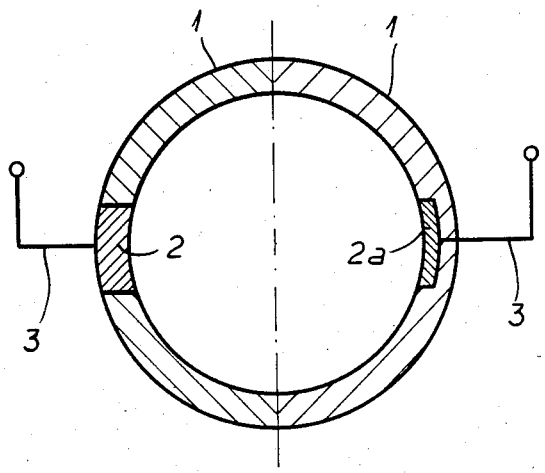
FIG. 2 a section through a ceramic tube with two differently constructed ceramic measuring electrodes.

For the construction and arrangement of the ceramic measuring electrode 2, depending on the desired properties and the selected manufacturing process, numerous variants are possible. Instead of the oval cross section shown in FIG. 1, embodiments having round, square, rectangular cross sections are also possible. The ceramic measuring electrodes 2 can be built in their "thick portion" to correspond to the thickness of the wall of the ceramic measuring tube 1 or thinner, as for instance represented for the measuring electrodes 2a in the right half of FIG. 2. If preformed and sometimes preburnt ceramic bodies are inserted in correspondingly shaped cutouts in the walling of the measuring tube, the margins can also be conically shaped. In the case of pasting, preferably a ceramic paste mass is used, which corresponds to both ceramic materials of the measuring tube 1 respectively the measuring electrodes 2, especially from the point of view of heat expansion. In a modification of the shown embodiment, a measuring tube 1 can be equipped instead of two measuring electrodes 2 with several ceramic measuring electrodes.

I claim:

1. In a magnetic-inductive flowmeter wherein the flow of a conductive material is measured, and having a measured-value sensor traversed by the conductive material, the improvement wherein said measured-value sensor is an electrically insulating ceramic tube having a pair of electrodes formed by electrically conductive ceramic material fused in said tube and having surfaces lying along an inner surface of said tube for contact with said material, and means connected to said electrodes enabling said electrodes to measure said flow, said tube being composed of silicon nitride and said electrodes being composed of silicon carbide.

2. The improvement defined in claim 1 wherein an electrically conductive ceramic ring forming a grounding ring is fused to and integrated with said tube at one end thereof.

3. The improvement defined in claim 2 wherein said ring is composed of silicon carbide.

4. In a magnetic-inductive flowmeter wherein the flow of a conductive material is measured, and having a measured-value sensor traversed by the conductive material, the improvement wherein said measured-value sensor is an electrically insulating ceramic tube having a pair of electrodes formed by electrically conductive ceramic material fused in said tube and having surfaces lying along an inner surface of said tube for contact with said material, and means connected to said electrodes enabling said electrodes to measure said flow, an electrically conductive ceramic ring forming a grounding ring being fused to and integrated with said tube at one end thereof.

5. The improvement defined in claim 4 wherein said ring is composed of silicon carbide.

* * * * *